United States Patent [19]

Kubota et al.

[11] Patent Number: 4,873,579
[45] Date of Patent: Oct. 10, 1989

[54] IMAGE INFORMATION READING APPARATUS

[75] Inventors: Tooru Kubota; Hiroyuki Mori, both of Tokyo, Japan

[73] Assignee: Kabushiki Kaisha Toshiba, Kawasaki, Japan

[21] Appl. No.: 240,654

[22] Filed: Sep. 6, 1988

[30] Foreign Application Priority Data

Sep. 7, 1987 [JP] Japan ................ 62-223346

[51] Int. Cl.⁴ ............................................. H04N 1/10
[52] U.S. Cl. .................................... 358/471; 358/474; 358/494
[58] Field of Search ..................... 358/285, 293, 294

[56] References Cited

U.S. PATENT DOCUMENTS 4,623,937 11/1986 Watanabe ...................... 358/285
4,704,638 11/1987 Igarashi ......................... 358/285

Primary Examiner—Howard W. Britton
Attorney, Agent, or Firm—Finnegan, Henderson, Farabow, Garrett & Dunner

[57] ABSTRACT

In an image information reading apparatus according to the present invention, a scanner for reading an image is driven along the surface of a desired image sheet to scan the same, by means of a drive unit, in a manner such that the scanner is opposed to the sheet. The scanner is composed of a fluorescent lamp for applying a light beam to the sheet and a photoelectric converter for reading the light reflected from the sheet, and is housed in a case having a transparent cover which faces the image sheet. The fluorescent lamp, which is housed in the case, cannot be influenced by a temperature change outside the case, so that it can expose the sheet surface with a uniform illuminance.

9 Claims, 6 Drawing Sheets

IMAGE INFORMATION READING APPARATUS

BACKGROUND OF THE INVENTION

1. Field of the Invention

The present invention relates to an image information reading apparatus, and more particularly, to an apparatus for reading image information on sheets by utilizing reflected and transmitted light beams.

2. Description of the Related Art

Recently have been developed an image information reading apparatus, called a color scanner, which can read image information on a sheet, such as a document, photograph, etc. The reading apparatus is provided with a light source lamp for exposing the sheet, with the image information thereon, to light. A fluorescent lamp is used as the light source lamp on account of its low costs and capability of emitting white light which covers a wide range of wavelength. A light beam emitted from the fluorescent lamp is guided to a photoelectric converter after being reflected by or transmitted through the surface of the sheet bearing the image information. The light beam incident upon the converter is converted thereby into an electrical signal, which is transmitted. The transmitted signal is converted into an image signal by, for example, a host computer.

In conventional image information reading apparatuses, a scanner is used to read an image from a sheet (U.S. Pat. No. 4,704,638). The scanner, which is composed of a straight-tube fluorescent lamp and a photoelectric converter, such as a CCD line sensor, is mounted on a carriage substrate. On the carriage substrate, the fluorescent lamp and the photoelectric converter are arranged in parallel with each other, with respect to their longitudinal direction. Also, the lamp and the converter are opposed to the sheet surface in order that a light beam reflected by the sheet is incident upon the converter. The carriage substrate is reciprocated (for sub-scanning) at right angles to the longitudinal direction of the line sensor, along the sheet surface with the image information thereon, by conventional drive means. While the substrate is reciprocating in this manner, a light beam is emitted from the fluorescent lamp toward the sheet surface, and the light beam reflected by the sheet surface is read by the photoelectric converter. Thus, an image is read from the desired sheet by the scanner, including the fluorescent lamp and the photoelectric converter, is driven along the sheet surface for scanning.

In these image information reading apparatuses with the scanner, the read image information or the quality of the read image often proved uneven with respect to the longitudinal direction of the straight-tube fluorescent lamp and the line image sensor. The following factor has been found out as a cause of this awkward situation.

In the reading apparatuses, the scanner is housed in a chassis which is hermetically isolated from the outside air. The chassis also contains a power source circuit, various control circuits, devices for scanning, and other elements which inevitably produce heat. Therefore, the chassis is provided with some ventilation means for cooling these heat generating elements. Conventional cooling methods includes, for example, a method in which the heated elements are cooled forcibly by means of blowers. According to this method, the outside air is introduced into the chassis by the blowers, thereby cooling the inside of the chassis. As the open air flows into the chassis, the temperature distribution therein becomes uneven. If the temperature distribution inside the chassis is uneven with respect to the longitudinal direction of the photoelectric converter, for example, the tube-wall temperature of the fluorescent lamp, mounted on the carriage substrate, is also uneven with respect to the longitudinal direction. It is well-known that the luminous efficacy of a fluorescent lamp is highly susceptible to the ambient temperature. In general, the luminous efficacy is the highest when the ambient temperature ranges from 40° C. to 50° C. If the temperature is higher or lower, then the efficacy is lower. As the luminous efficacy lowers, the illuminance of light emitted from the lamp lowers correspondingly. If the tube-wall temperature of the lamp is uneven especially with respect to its longitudinal direction, therefore, the illuminance distribution of the lamp is also uneven with respect to the longitudinal direction. Thus, the quality of the image information read by the photoelectric converter is lowered.

SUMMARY OF THE INVENTION

Accordingly, the object of the present invention is to provide an image information reading apparatus in which the unevenness of the temperature distribution around a fluorescent lamp therein is corrected to ensure high image quality.

According to the present invention, there is provided an image information reading apparatus which comprises support means or supporting the sheet mounted thereon;

first illuminating means for illuminating the sheet with light, the first illuminating means extending in a first direction which is parallel to a surface of the sheet;

first housing means for housing the first illuminating means so as to seal said illuminating means therein, the first housing means including a transparent section through which the light emitted from the first illuminating means and is directed toward the sheet;

photoelectric converting means, which extends parallel to the first direction, for converting the light reflected from the sheet into electric signals; and driving means for simultaneously driving the first illuminating means and the photoelectric converting means in a second direction which is parallel to the surface of the sheet and is perpendicular to the first direction.

According to the invention, the surface of the sheet, carrying image information thereon, can be exposed with a uniform illuminance, so that the picture quality of detected image is improved.

DETAILED DESCRIPTION OF THE PREFERRED EMBODIMENTS

An image information reading apparatus according to an embodiment of the present invention will now be described in detail with reference to the accompanying drawings.

Figure 1:
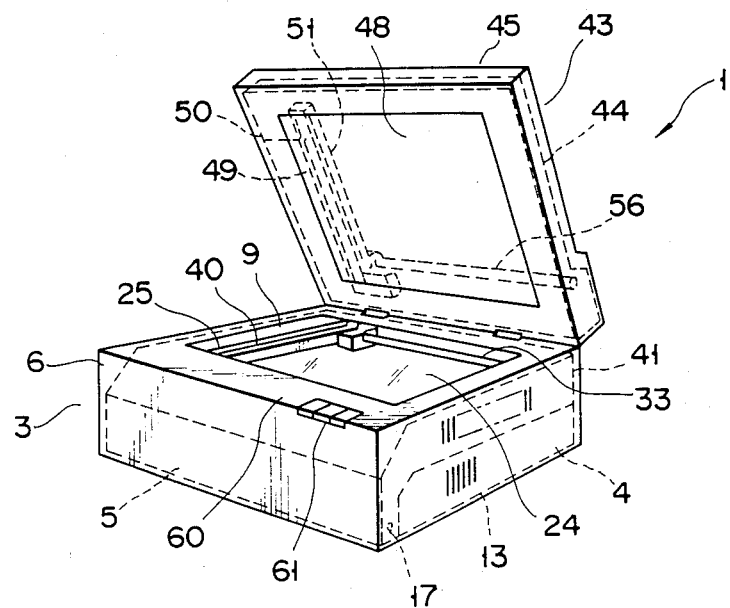
FIG. 1 is a perspective view of an image information reading apparatus according to the present invention.
Figure 2:
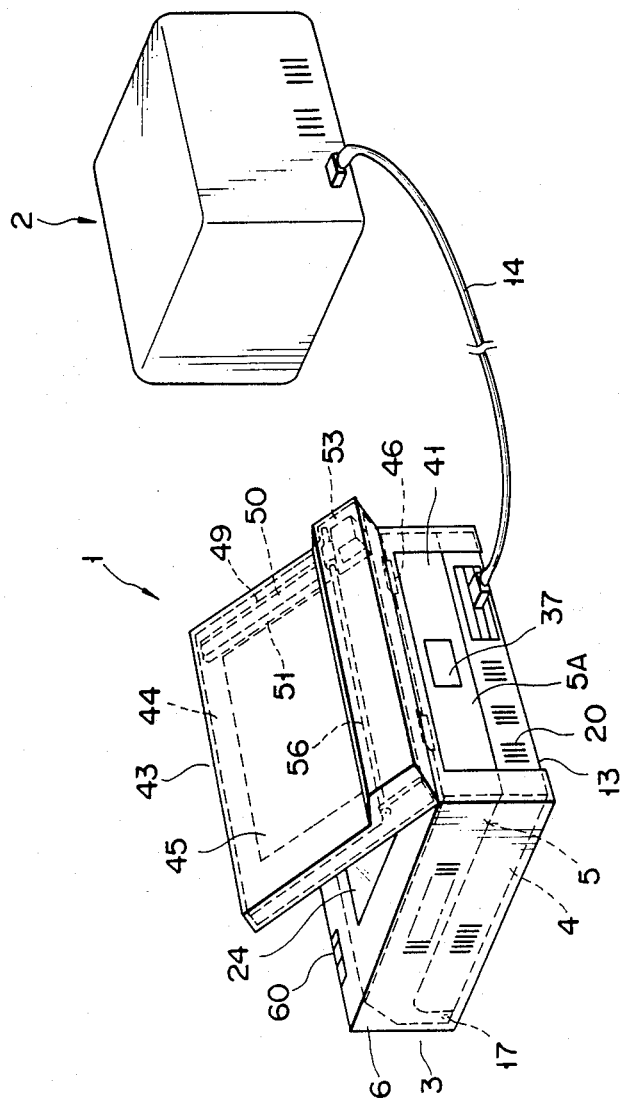
FIG. 2 is a perspective view showing the image information reading apparatus and an external apparatus connected thereto.
Figure 3:
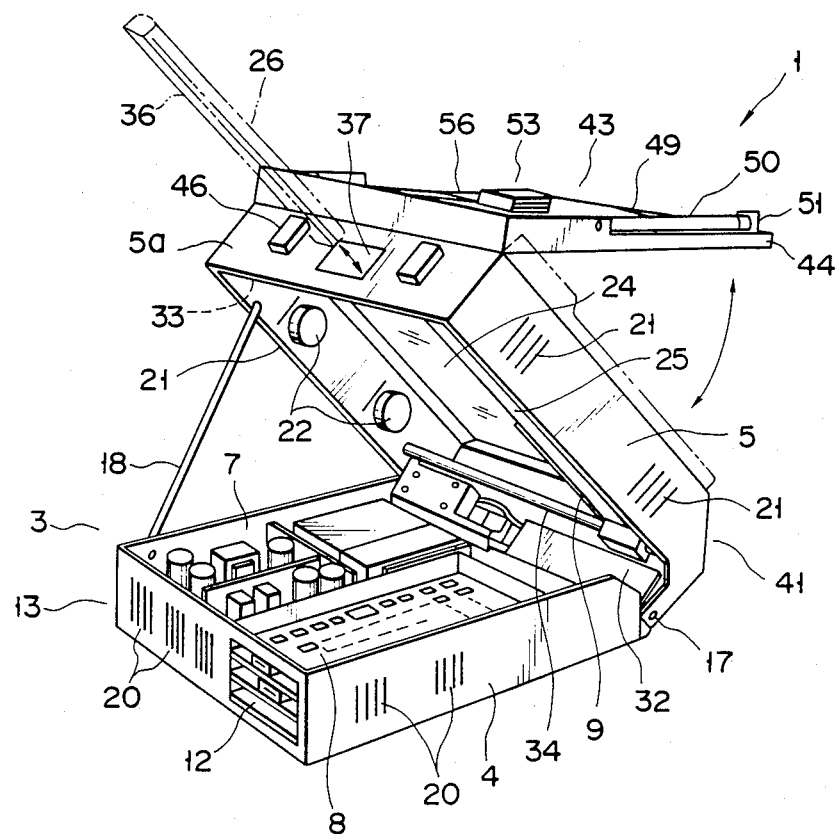
FIG. 3 is a perspective view showing an internal construction of the image information reading apparatus.
Figure 4:
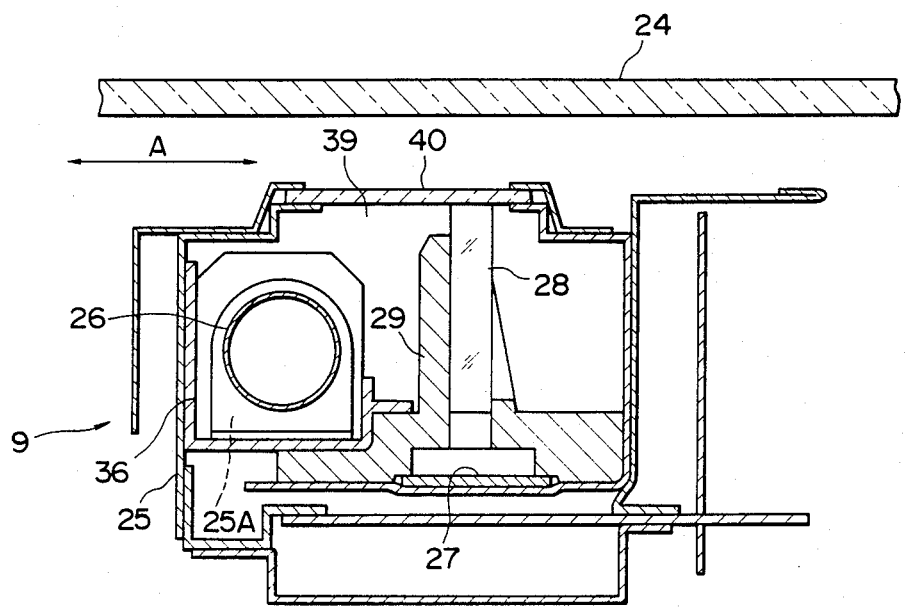
FIG. 4 is a sectional view showing an arrangement of a scanner in the image information reading apparatus.

FIG. 1 is a front perspective view of the image information reading apparatus, while FIG. 2 is a rear perspective view showing the reading apparatus and an external apparatus connected thereto. Image information reading apparatus 1 shown in FIGS. 1 and 2 is generally called as a color scanner. Apparatus 1 comprises a scanner for reading an image. A desired image can be read by scanning a reflective sheet (document, photograph, etc.) or a transmission sheet (positive film, negative film, OHP paper, etc.), bearing the image thereon, by means of the scanner. Body 3 of reading apparatus 1 is composed of metallic first chassis 4, substantially in the form of a box, and second chassis 5 mounted on first chassis 4. Chassis 4 and 5 are removably enclosed by substantially box-shaped plastic cover 6. The internal constructions of chassis 4 and 5 are shown in FIG. 3. As shown in FIG. 3, first chassis 4 houses power circuit section 7 for driving light source 26, scanner 6, a light source assembly 49, blowers 22, etc. (mentioned later), control circuit boards 8, and the like. Circuit section 7 is composed of a transformer, rectifier, capacitor, and various other electrical components, and includes a A/D converter circuit used to convert an externally applied AC current into a DC current. Board holder section 12, which is also housed in first chassis 4, contains circuit boards 8, including a board mounted with an interface circuit of, e.g., a GPIB, a board for processing a driving signal for the scanner, and a board for processing an image signal detected by the scanner. First chassis 4 and these electric components therein constitute power source unit 13. Circuit boards 8 of unit 13 are connected to external apparatuses, such as various computers, color printer, and filing apparatus, by means of cables which are used to connect interface connectors and the external apparatuses. First hinge portion 17 is attached to the lower end portion of the rear face of first chassis 4 so as to extend along the edge of chassis 4. Second chassis 5 is vertically swingably supported on first chassis 4 by means of hinge portion 17. In FIG. 3, second chassis 5 is swung open at a proper angle to first chassis 4, and is held in position by means of stopper 18. Vent holes 20 and 21 are bored through predetermined portions of the side faces of chassis 4 and 5, respectively. Adjoining holes 20 and 21, blowers 22 (only two of which are shown in FIG. 3) for circulating cooling air are mounted inside chassis 4 and 5. Sheet table 24 is mounted on the top of second chassis 5. It serves to carry the sheet which bears the image information. Table 24 is formed of a light transmitting material, such as platen glass. Scanner 9 for reading the image information from the sheet is housed in second chassis 5. Scanner 9 is opposed to the inside of sheet table 24 on the top of chassis 5, and is used to red the image information from the sheet on the table. Second chassis 5, scanner 9 therein, etc. constitute scanning unit 41. FIG. 4 shows the construction of scanner 9 for reading the image from the sheet.

Figure 5:
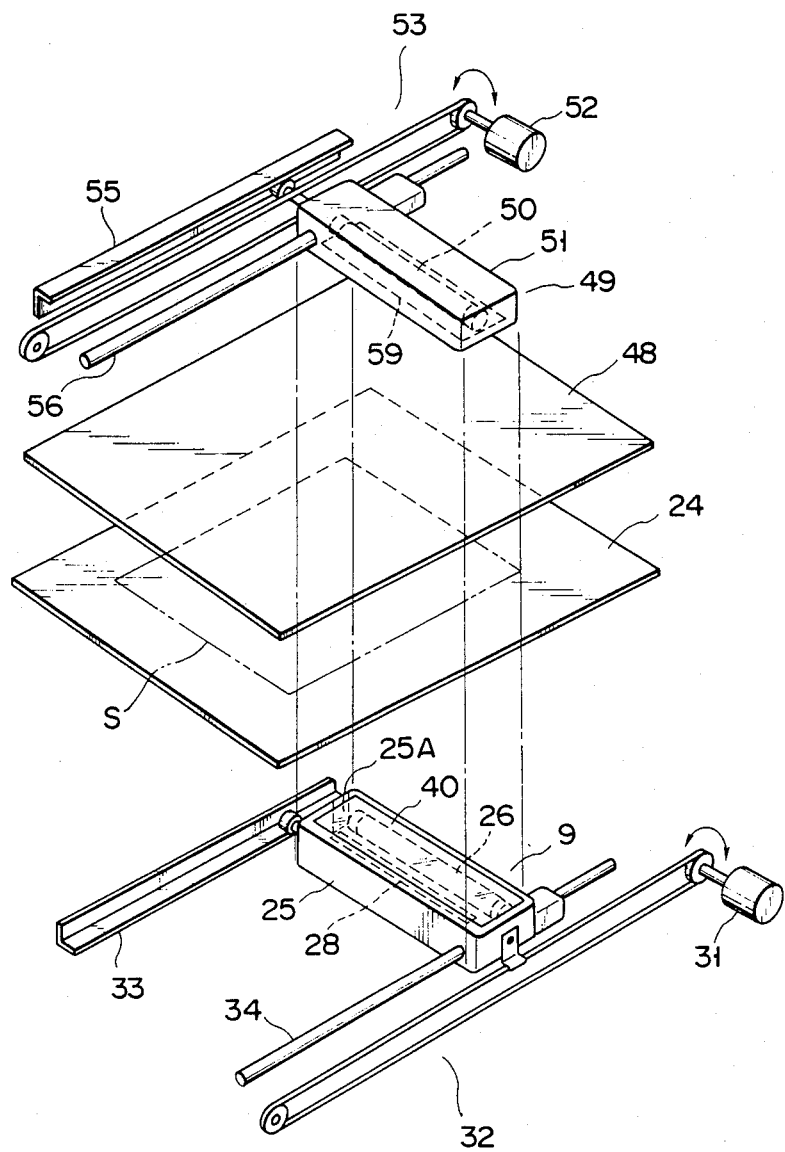
FIG. 5 is an exploded perspective view showing an arrangement of the scanner in the image information reading apparatus and other devices associated therewith.

As shown in FIG. 4, scanner 9 includes straight-tube fluorescent lamp 26, for use as a light source for applying a light beam to the sheet, photoelectric converter 27, such as a CCD line sensor, for converting the light beam reflected by the sheet into an electrical signal, and optical member 28, such as a rod lens array, for guiding the light beam to converter 27. These components are housed in carriage case 25 which is formed of a metal plate, for example, and is hermetically isolated from the outside air. As shown in FIG. 5, the longitudinal dimension of case 25 is equal to or greater than the length of one side of the sheet from which the image information is to be read. Fluorescent lamp 26 is attached to an inner wall of case 25 by means of lamp holder 36, while photoelectric converter 27 and optical member 28 are mounted on another inner wall of case 25 by means of support base 29. Member 28 and converter 27 have their longitudinal directions parallel to each other in order that the light beam applied from lamp 26 to the sheet can be incident upon the converter after being reflected by the sheet. Further, the respective lengths of lamp 26 and converter 27 are equal to or greater than the length of one side of the sheet from which the image information is to be read. The top face of carriage case 25 is composed of plate-shaped transparent cover member 40 made of transparent glass or synthetic resin, such as acrylic resin. Cover member 40 is opposed to the underside of sheet table 24. The length of member 40 is also equal to or greater than the length of one side of the sheet from which the image information is to be read. The transparent cover member provides lighting region 39 in closed case 25. Constructed in this manner, scanner 9 is reciprocated (for sub-scanning in the longitudinal direction of guide 33 and rail shaft 34, along the sheet surface, by means of conventional drive means 32 including motor 31 or the like, as shown in FIG. 5. While scanner 9 is reciprocating in this manner, the sheet is exposed to the light beam emitted from fluorescent lamp 26 of the scanner, and the reflected light beam from the sheet is projected upon photoelectric converter 27. The light incident upon converter 27 is converted into an electrical signal, thus providing the desired image information.

Fluorescent lamp 26 is attached to lamp holder 36 in the carriage case 25. Holder 36 is mounted on case 25 so as to be slidable in the longitudinal direction of the case. Thus, holder 36 can be readily removed from or attached to case 25 when the lamp is to be replaced with a new one. Also, case 25 is formed, in one end face thereof, with opening 25A through which the lamp holder can be taken out of the case. For the ease of the replacement of lamp 26, moreover, opening 37 is bored through the central portion of rear wall 5A of second chassis 5, as shown in FIG. 3. Opening 37 is large enough to permit the passage of lamp holder 36, and is situated corresponding to opening 25A of case 25. In a normal operating state, that is, when fluorescent lamp 26 is housed in case 25, opening 25A is closed by holder 36. When lamp 26 is to be replaced, holder 36 is drawn out of carriage case 25 through opening 25A. In image information reading apparatus 1 according to the present invention, a control signal is transmitted to a host computer, which is connected to apparatus 1, whereby the drive position of scanner 9 is controlled. In controlling scanner 9 by means of the host computer, a program may be prepared in advance such that the scanner is stopped when its opening 25A is aligned with opening 37 to facilitate the replacement of the fluorescent lamp, for example. As mentioned before, carriage case 25, which constitutes the scanner of the invention, has its top face composed of plate-shaped transparent cover member 40, and is substantially hermetically isolated from the outside. Therefore, fluorescent lamp 26, which is disposed inside case 25, cannot be influenced by the change of the ambient temperature, i.e., the temperature inside chassis 4 and 5. Moreover, dust or other foreign matters can be prevented from entering the inside of case 25.

Light transmission unit 43 is disposed on the top of body 3 of image information reading apparatus 1, that is, on sheet table 24 of scanning unit 41. It serves as a light source for reading the image from a transmission sheet. Transmission unit 43 includes box-shaped metallic chassis 44, a light source assembly therein, etc. Chassis 44 is jacketed with plastic cover 45. As shown in FIG. 3, a second hinge portion 46 is pivotally mounted on the respective side faces of chassis 44 of unit 43 and second chassis 5 of scanning unit 41. The second hinge portion is arranged along the opposite side face of chassis 5 to first hinge portion 17, that is, along the front end face (as in FIG. 3) of chassis 5. Chassis 44 is vertically swingably supported on second chassis 5 by means of second hinge portion 46. The underside of chassis 44, which faces the top face of sheet table 24, is covered by transmission plate 48. Plate 48 is formed of a white or milk white light transmitting material, such as glass, which transmits some color components. Light source assembly 49 is disposed inside chassis 44 whose bottom face is composed of transmission plate 48. Straight-tube fluorescent lamp 50 as a light source, for example, is housed in carriage case 51 of assembly 49. Preferably, case 51 and lamp 50 therein have substantially the same sizes and shapes as carriage case 25 and fluorescent lamp 26 in scanner 9, respectively. More specifically, the respective longitudinal dimensions of case 51 and lamp 50 are equal to or greater than the length of one side of the sheet from which the image information is to be read. The bottom face of carriage case 51, which faces sheet table 24, is composed of plate-shaped transparent cover member 59 made of transparent glass or synthetic resin, such as acrylic resin. Cover member 59 provides lighting region 59 in case 51. Constructed in this manner, light source assembly 49, like scanner 9, is reciprocated at right angles to the longitudinal direction of fluorescent lamp 50, that is, in the longitudinal direction of guide 33 and rail shaft 34, by means of conventional drive means 53 including motor 52 or the like. Further, assembly 49 is set so that a light beam emitted therefrom is transmitted through the sheet to be always incident upon photoelectric converter 27 in scanner 9. In other words, carriage cases 51 and 25 of assembly 49 and scanner 9 always face each other with sheet S between them. Thus, when scanner 9 is driven along the longitudinal direction of guide 33 and rail shaft 34 by drive means 53, for example, light source assembly 49 is also driven along the longitudinal direction of guide 55 and rail shaft 56 at the same speed. Thereupon, the light beam emitted from assembly 49 is transmitted through the sheet from which the image is to be read, to be incident upon converter 27. In this manner, the image information is read from the desired sheet. Like drive means 32, drive means 53, which is used to drive light source assembly 49, is connected to power source unit 13 for controlling its driving signal.

The following is a description of the operation of the image information reading apparatus constructed as aforesaid.

Figure 6:
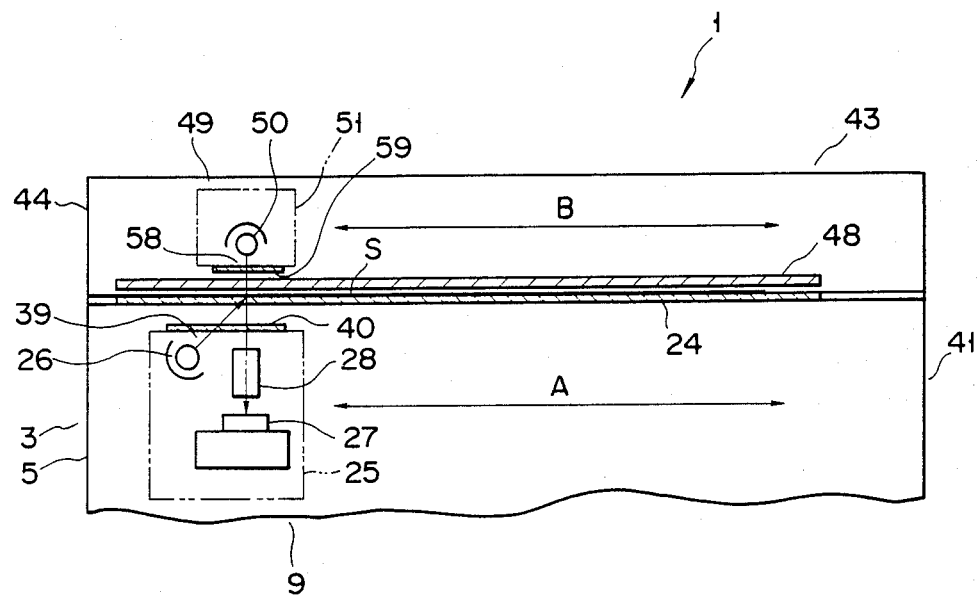
FIG. 6 is a sectional view showing the scanner and the associated devices shown in FIG. 5.

As shown in FIG. 6, sheet S with the image information thereon is placed on sheet table 24. If sheet S is a reflective sheet from which the image information is read by means of a reflected light beam, it is exposed to the light beam emitted from fluorescent lamp 26 of scanner 9. The applied light beam is reflected in accordance with the image on sheet S. Part of the reflected light beam, i.e., the light reflected by a specific region in alignment with the extending direction of lamp 26 is transmitted through optical member 28, and is converted into an electrical signal by photoelectric converter 27. In such an arrangement that the light corresponding to the specific region is photoelectrically converted, scanner 9 is driven along the extending direction of the sheet surface by drive means 32. More specifically, the scanner is reciprocated (for sub-scanning) in the direction of arrow A in FIG. 5, that is, at right angles to the longitudinal direction of lamp 26 and converter 27. Thus, the desired image information is read from the whole region of the reflective sheet. When the information is read from the reflective sheet, light source assembly 49 of transmission unit 43 is not operated. The electrical signal delivered from photoelectric converter 27 is supplied to power source unit 13, and is processed in a specific manner.

If sheet S is a transmission sheet from which the image information is read by means of a transmitted light, on the other hand, it is exposed to the light beam emitted from fluorescent lamp 50 of transmission unit 43. The applied light beam is transmitted in accordance with the image on sheet S. Part of the transmitted light beam, i.e., the light transmitted through a specific region in alignment with the extending direction of lamp 50 is transmitted through optical member 28, and is converted into an electrical signal by photoelectric converter 27. In such an arrangement that the light corresponding to the specific region is photoelectrically converted, scanner 9 is driven in the direction of arrow B or along the sheet surface by drive means 53. At the same time, light source assembly 49 is driven in the same direction (direction of arrow B) and at the same speed with scanner 9. Thus, the image information is read from the whole region of the transmission sheet. The image information converted into the electrical signal by converter 27 is converted into a digital signal by means of an A/D converter circuit (not shown), and is communicated with external apparatus 2, such as a color printer or computer, by means of cable 14. The operation mode can be switched according to the type of the sheet used by operating keys 61 of control panel section 60 shown in FIG. 1.

In the image information reading apparatus described above, fluorescent lamp 26 in chassis 5 and fluorescent lamp 50 of light source assembly 49 are housed in carriage cases 25 and 51, respectively, which are hermetically isolated from the outside air. Therefore, the temperatures inside cases 25 and 51 are uniformed with respect to the longitudinal direction of the lamp 26 and lamp 50, respectively, so that the illuminances of lamps 26 and 50 are also equalized. Thus, even if the temperature distributions around scanner 9 and light source assembly 49 vary drastically, the longitudinal illuminance distributions of fluorescent lamps 26 and 50 are equalized. For these reasons, the sheet surface can be exposed with a uniform illuminance, so that the picture quality of detected image is improved. Further, cover members 40 and 59 serve to prevent dust or other foreign matters from entering the inside of scanner 9. Since transmission unit 43 is not provided with any power circuit or control circuits, moreover, it is less influenced by air currents than power source unit 13 and scanning unit 41. Accordingly, fluorescent lamp 50 of unit 43 need not be covered by cover member 59. Alternatively, lamp 50 may be covered substantially entirely by a transparent cover member. Furthermore, the apparatus of the present invention may be used as an image information reading apparatus for reading image information from reflective sheets only. In this case, transmission unit 43 may be replaced with a swingable sheet cover mounted on sheet table 24.

What is claimed is:

1. An apparatus for reading an image from an image data-containing sheet, comprising:
    support means for supporting the sheet mounted thereon;
    first illuminating means for illuminating the sheet with light, said first illuminating means extending in a first direction which is parallel to a surface of the sheet;
    first housing means for housing said first illuminating means so as to seal said illuminating means therein, said first housing means including a transparent section through which the light emitted from said first illuminating means and is directed toward the sheet;
    photoelectric converting means, which extends parallel to said first direction, for converting the light reflected from the sheet into electric signals; and
    driving means for simultaneously driving said first illuminating means and said photoelectric converting means in a second direction which is parallel to the surface of the sheet and is perpendicular to said first direction.

2. The apparatus according to claim 1, wherein said first housing means includes a setting means for setting said photoelectric converting means.

3. The apparatus according to claim 1, wherein said illuminating means includes a straight-tube fluorescent lamp.

4. The apparatus according to claim 1, wherein said photoelectric converting means includes a CCD line sensor.

5. The apparatus according to claim 1, further comprising means for allowing said first illuminating means to be removed from said first housing means for replacement.

6. The apparatus according to claim 1, further comprising second illuminating means, which extends in said first direction, for illuminating the sheet, said second illuminating means and said photoelectric converting means facing each other with the sheet interposed therebetween.

7. The apparatus according to claim 6, further comprising second housing means for housing said second illuminating means, said second housing means including a transparent section through which the light emitted from said second illuminating means is directed toward the sheet, said second illuminating means being sealed by said second housing means.

8. The apparatus according to claim 6, further comprising second driving means for driving said second illuminating means along the surface of the sheet in said second direction.

9. An apparatus for reading an image from an image data-containing sheet, comprising:
    support means for supporting the sheet mounted thereon;
    illuminating means for illuminating the sheet with light, said illuminating means extending in a direction which is parallel to a surface of the sheet; and
    housing means for housing said illuminating means, so as to seal said illuminating means therein, said housing means including a transparent section through which the light emitted from said illuminating means and is directed toward the sheet.

* * * * *